United States Patent [19]

Greenhalgh

[11] Patent Number: 4,666,971

[45] Date of Patent: May 19, 1987

[54] THERMAL-SENSITIVE INSULATING COMPOSITION COMPRISING CURED ACRYLONITRILE BUTADIENE CARBOXYLIC ACID RUBBERS CONTAINING FILLER MATERIALS

[75] Inventor: Milton S. Greenhalgh, Fairfield, Conn.

[73] Assignee: General Electric Company, Bridgeport, Conn.

[21] Appl. No.: 709,246

[22] Filed: Mar. 7, 1985

Related U.S. Application Data

[62] Division of Ser. No. 548,376, Nov. 3, 1983, Pat. No. 4,617,454.

[51] Int. Cl.[4] .......................... C08K 3/34; C08K 3/04; C08L 33/00

[52] U.S. Cl. .................................... 524/445; 524/447; 524/521; 524/522; 524/556; 524/565; 524/567

[58] Field of Search ............... 524/521, 522, 445, 556, 524/447

[56] References Cited

U.S. PATENT DOCUMENTS

| | | | |
|---|---|---|---|
| 3,283,034 | 11/1966 | Urbanic et al. | 524/521 |
| 3,409,567 | 11/1968 | Dinsdale et al. | 524/521 |
| 3,419,511 | 12/1968 | Condo et al. | 524/521 |
| 4,168,285 | 9/1979 | Turczyk | 524/521 |
| 4,354,001 | 10/1982 | Kuan | 524/522 |
| 4,370,440 | 1/1983 | Schwarz | 524/522 |
| 4,436,857 | 3/1984 | Kuan et al. | 524/522 |

FOREIGN PATENT DOCUMENTS

| | | | |
|---|---|---|---|
| 2803952 | 8/1978 | Fed. Rep. of Germany | 524/447 |
| 0026248 | 7/1977 | Japan | 524/447 |
| 6157441 | 12/1981 | Japan | 524/521 |
| 0675061 | 7/1979 | U.S.S.R. | 524/447 |

OTHER PUBLICATIONS

Derwent Abstract 15482 W/09 (SU423819) (9-1974).
Derwent Abstract 64552 U/43 (J4847554) (7-1973).
Derwent Abstract 81634 W/50 (DL-115308) (9-1975).
Derwent Abstract 87888 Y/49 (SU-535325) (11-1976).
Derwent Abstract 12213 W/07 (SU-421701) (9-1974).
Derwent Abstract 04427 W/03 (J49023839) (3-1974).

*Primary Examiner*—Herbert J. Lilling
*Attorney, Agent, or Firm*—Hedman, Gibson, Costigan & Hoare

[57] ABSTRACT

Novel acrylonitrile butadiene and carboxylated acrylonitrile butadiene elastomeric admixtures compounded with various amounts of mineral fillers such as silicates, silicas, etc., carbon blacks, and plasticizers such as esters, epoxidized polyesters, etc., are useful as continuous temperature-sensitive solids when applied to metallic conductors as coatings whereby one leg acts as a conductor and the other is used as the sensing leg. These electrical properties of these admixtures such as volume resistivity, impedance, and reactance are uniquely sensitive to temperature changes from room temperature to at least 90° C. and thus offer new and important circuit design opportunities for monitoring and detecting temperature changes. These admixtures which are essentially thermosetting may be combined with other resins such as polyvinyl chloride and used thermoplastically. In these cases, the elastomer becomes the plasticizer.

4 Claims, 7 Drawing Figures

THERMAL-SENSITIVE INSULATING COMPOSITION COMPRISING CURED ACRYLONITRILE BUTADIENE CARBOXYLIC ACID RUBBERS CONTAINING FILLER MATERIALS

This application is a division of application Ser. No. 548,376, filed Nov. 3, 1983, now U.S. Pat. No. 4,617,454.

FIELD OF THE INVENTION

The present invention relates generally to the subject of electrical insulation technology and is more particularly concerned with the novel compositions having a unique thermal-sensitivity characteristic, with new articles and apparatus incorporating those compositions and importantly dependent in their utility upon that characteristic, and with the new method of producing said articles.

BACKGROUND OF THE INVENTION

Insulating materials having temperature-dependent electrical resistance or capacitance characteristics have long been extensively used in overheat sensing and control applications. Thus, by virtue of the invention of Spooner and Greenhalgh disclosed and claimed in U.S. Pat. No. 2,581,212 overheat protection for electric blankets and similar articles is provided for the use of such materials to afford the essential safety factor. In accordance with the teachings of that patent, the insulating material is operatively associated with switch means and is coextensive with the heating element so that when the temperature anywhere in the blanket exceeds a predetermined maximum, the blanket heating power supply is interrupted. Because this insulating material is not altered physically or otherwise irreversibly changed in so functioning, it is useful repeatedly for this purpose as it acts as a sort of electrical switch constantly monitoring the blanket operating temperature limit.

A variety of insulating materials are identified in the prior art as being suitable for such use. Those include in addition to the preferred Nylon polyamide resin of the aforesaid patent, polymeric organic materials such as polyvinyl chloride and cellulose esters containing additives imparting the desired electrical characteristics. In U.S. Pat. No. 2,745,944 to Price, still another kind of material for this same purpose, sulphur-cured butadiene-acrylonitrile elastomer is disclosed. That material and all the others of the prior art, however, are in one respect or another, less than what has been desired and general recognition of that fact has failed heretofore to result in a thermal-sensing insulating material approaching the ideal which would combine the best properties and characteristics of each of those, but would be free, at least to a large degree, from their major drawbacks which are relatively low levels and ratios of changes in impedance with temperature and, in the case of DC volume resistivity, high levels of volume resistivity and low ratios of changes in volume resistivity to temperature. In addition as in the case of Nylon resin, the effect of humidity shifts the levels of impedance resistivity to the extent that control circuits become a problem.

The practical significance of such shortcomings of prior art thermal-sensing materials is apparent from the commercial electric blanket experience. Thus when exposed to moisture, the Nylon insulation loses its desirable electric properties to a large extent in only an hour or two, and even though that insulation in an electric blanket is covered by a layer of polyethylene and an overlayer of polyvinyl chloride as described in the Spooner and Greenhalgh patent reference above, moisture-induced deterioration occurs at a substantial rate. It is for this reason that there have been a rash of early failures of electric blankets in regions of high humidity such as the Texas Gulf Coat. The possibility of limiting the consequences of this destructive effect of high moisture-content atmospheres by increasing the shut-off temperature level so as to prolong the useful life of the Nylon insulation is not attractive for the reason that the safety factor is thereby substantially diminished.

The catastrophic effect of the presence of free sulfur in thermal-sensing insulation on wires of the type used in electric blanket structures has been demonstrated in tests under normal operating conditions running only six hours to wire failure.

SUMMARY OF THE INVENTION

On the basis of my discoveries and new concepts set forth below upon which the present invention stands, the various shortcomings of the thermal-sensing insulating materials previously known can be avoided and important new results can be obtained. Thus, by virtue of my invention, it is now possible to produce an insulated electrical conductor which is relatively insensitive to atmospheric moisture fluctuations and resistant to stress cracking and yet has overheat detection capability matching that of the best heretofore known. In fact, in preferred form, the thermal-sensing capability of the insulating compositions of this invention is substantially greater than any of the prior art, the specific inductive capacitance (S.I.C.) 90° C. to room temperature ratio being higher by a factor of at least 3 to more than 5. Further, unlike some thermal-sensitive prior art conductor coverings, all these new insulating compositions are free from the tendency to cause conductor corrosion and being thermosetting, they are not subject in use either to deformation or to additive migration detrimental to desired or intended purpose or function. Still another important advantage of the insulating compositions of this invention over those known heretofore is that they are amenable to compounding with additives enhancing their temperature-sensitivity characteristics.

One of the important discoveries which I made in the course of making this invention is that acrylonitrile butadiene rubbers containing substantially no free or elemental sulphur can be used to provide temperature-sensing insulation on electrical conductors affording the advantages set forth above. Also I found that the proportion of acrylonitrile in these rubbers determines the extent to which they have the desired electrical response. Further, I found that by using carboxylated acrylonitrile butadiene as the base elastomer in these compounds, their desirable characteristics can be substantially improved without incurring any offsetting disadvantage or detrimental effect. In particular, when the compositions contain at least 0.5% of carboxylic units by weight, resistant to high temperature aging is enhanced as are physical properties together with the ratio of change in electrical response for both S.I.C. and volume resistivity as the temperature is increased from room temperature to 90° C.

I additionally discovered that resins, particularly polyvinyl chloride, can be used to advantage in combination with these rubbers to provide blends which can be mixed or compounded readily for the best properties, and for extrusion as thin film insulation on wires and the like. Further, such improvement is possible with carboxylated acrylonitrile butadiene formulations as well as with acrylonitrile butadiene formulations.

Still further, I found that clay, and particularly Catalpo clay, which is kaolin, can dramatically enhance the desirable electrical properties of these insulating materials. In the case of Catalpo which is kaolin (Freeport Kaolin Co. trademark) clay, for instance, both the S.I.C. ratio and the volume resistance are altered to great advantage through its use as will be shown in detail below. This technology of selective compounding can be extended to other fillers such as silicas, carbon black, etc., as well as plasticizers, in accordance with my further findings.

Broadly and generally defined, this invention comprises an admixture of polymeric material, filler, plasticizer, etc., in proportion to optimize the desired electrical, physical and processing characteristics to achieve the product. For example, a continuous thermosensitive construction designed for the electrical blanket must be extremely flexible, have no odor, be non-staining to fabrics, have certain heat aging requirements, and capable of withstanding any cleansing operation. On the other hand, for hot spot detection such as in a fire alarm system, the compounded material need not be as flexible, non-odorous, but should be tougher so that it can be readily installed in various locations.

The polymeric material selected should contain substantially no free sulfur. In the case of the acrylonitrile butadiene formulations, the acrylonitrile must be present in amount of at least 1%; and for the carboxylated material, and acid monomer units should be present in amount of at least 0.5%.

In addition to being curable by either sulfur-bearing combinations or peroxide, the carboxylated polymer can be cured by zinc oxide. Further, both polymers (carboxylated and non-carboxylated acrylonitrile butadiene) can be used as plasticizers for such a resin as polyvinyl chloride.

In its method aspect, this invention comprises the steps of contacting and thereby covering at least a portion of the length of metal wire with thermal-sensitive polymeric material which is relatively insensitive to atmospheric moisture fluctuations and is resistant to stress cracking and corrosion, the polymeric material being selected from those set out in the section immediately above.

Similarly, in its article-of-manufacture aspect, this invention comprises at least a portion of an electrically conductive member such as a length of wire, and a covering on and in contact directly with the conductive member or wire, the covering comprising a thermal-sensitive polymeric material as defined above.

Finally, in its apparatus aspect, this invention is comprised of an electric-resistant system in combination with a heating or low-powered apparatus, including an electric conductor connectable to an electric power source and overheat control means operatively associated with the electric conductor and power source, and means for actuating the control means when an overheat condition exists in the electrical conductor in which the actuating means comprising thermal-sensitive polymeric material in contact directly with the electrical conductor and selected from the group as defined in the paragraphs immediately above. This is the electric blanket embodiment of this invention, but it will be understood that it is useful in other ways and organizations such as in association with smoke detector apparatus. In the latter, this inventioin takes the novel form of a hotspot detector comprising a reference conductor and a sensing conductor which are connectable to an electric power source, overheat signal or alarm means, and actuating means operatively associated with the signal means and the two conductors to actuate the signal means when D.C. resistance between the conductors exceeds a predetermined maximum. The conductors are wires spread uniformly apart over their full lengths and encased in a body of thermal-sensitive polymeric material which fills the space of 10 mils or so between the two conductors and which is of the novel composition and unique properties described above. It is in fact because of these properties of humidity resistance and thermal-sensitivity as elsewhere described in detail herein that this new apparatus exists, the Nylon resins and other materials used for such purpose heretofore being incapable of meeting service life requirements.

BRIEF DESCRIPTION OF THE DRAWINGS

Those skilled in the art will gain a further and better understanding of the present invention in all its aspects upon consideration of the detailed description set forth below, taken in conjunction with the drawings accompanying and forming a part of this specification, in which.

DETAILED DESCRIPTION OF THE DRAWINGS

In the practice of this invention, as indicated above, acrylonitrile butadiene rubber of the relatively high acrylonitrile type which has S.I.C. ratios (90° C. to room temperature) of the order of 10 or more are employed. Those materials preferably contain about 20% to 45% acrylonitrile by weight. Those containing substantially less than that have substantially inferior electrical properties for the purposes of this invention. Also, preferably acrylonitrile butadiene rubbers contain carboxyl groups which further enhance the desired electrical properties of interest, these being introduced by copolymerization with acrylonitrile and butadiene commonly derived from acrylic acid, methylacrylic acid, maleaic acid or the like. Preferably, the amount of carboxyl groups is more than the minimum of 0.5% by weight. Suitable polymers available on the market are set out in Table I.

TABLE I

| | % Butadiene | % Acrylo-Nitrile | % Carboxyl |
|---|---|---|---|
| Goodyear NX775 | 68 | 26 | 6 |
| Goodrich 1072 | 67 | 27 | 6 |
| Polysar 110C | 64 | 32 | 2 |
| Polysar 231C | 59 | 34 | 7 |

As with acrylonitrile butadiene elastomers, the curing system involves sulfur in the free state, sulfur bearing in which sulfur is available in combined form, and peroxide. In addition, carboxylated acrylonitrile butadiene combinations may be cured with a metallic oxide such as zinc oxide which is the preferred curing system. The amount of zinc oxide for this purpose may be from 1 to 10 pts on 100 pts. of elastomer.

In addition to the superior desired electrical properties carboxylated elastomers in the cured state have the additional attributes of increased hardness, tensile strength, ozone resistance, and abrasion resistance.

When it is not possible to cure the polymeric material on a conductor, blends of either the acrylonitrile butadiene or the carboxylated acrylonitrile butadiene may be used in combination with a suitable resin such as polyvinyl chloride. In either cure, the elastomer acts as a nonmigratory plasticizer and the mixture is considered to be pure thermoplastic. The preferred ratios of resin to elastomer are in the range of 1 to 4 to 1 to 1, respectively.

The combinations referred to above when containing a carboxylated elastomer have the additional advantage of retaining the inherent properties of the carboxylated elastomer even in the uncured state.

Figure 1:
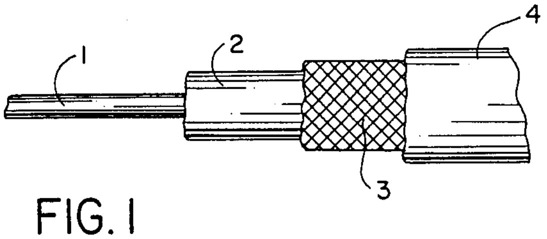
FIG. 1 is a fragmentary, side-elevational view, with parts broken away, of an electrical conductor of the electric blanket-type embodying this invention in preferred form.
Figure 2:
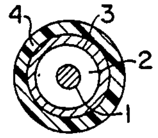
FIG. 2 is a transverse cross-sectional view of the conductor of FIG. 1.

Referring now to the drawings, an insulated structure of this invention is shown in FIG. 1 as comprising a copper wire 1 on which a composition of this invention has been extruded as a concentric cover 2 so that it is in direct contact with but not necessarily bonded to the wire and extends the full length of wire. Copper braid or wrap 3 is applied over the insulating cover 2 and a vinyl jacket 4 is provided to protect the copper braid, the layer sequence being typical of the electrical blanket type of wire construction. The symmetrical relationship of the several components are illustrated in FIG. 2 which is a transverse cross-sectional view of the insulated wire assembly.

Figure 3:
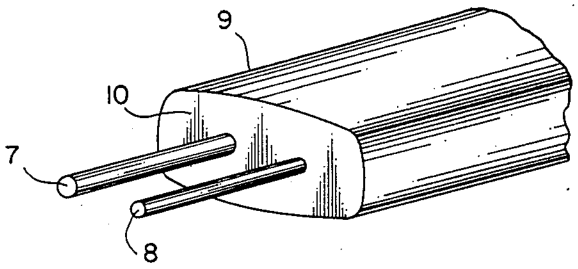
FIG. 3 is a perspective view, with parts broken away, of a pair of parallel conductors for use in a fire alarm system, the conductors being embedded in the composition of this invention in a manner such that temperature measurements between the two conductors by the composition of the insulation material can be made to monitor the system for fire control purposes.

FIG. 3 shows a structure which could be utilized in a typical firealarm system where heating is not required as in the case of the FIG. 1 construction. In this view, the copper wires 7 and 8 are spaced about 10 mils apart and insulated and united in an integral structure with a layer of temperature-sensing material 9 of the present composition which, as in the case above, is co-extensive with the wires. This construction is apparent in the perspective view of this drawing.

Figure 4:
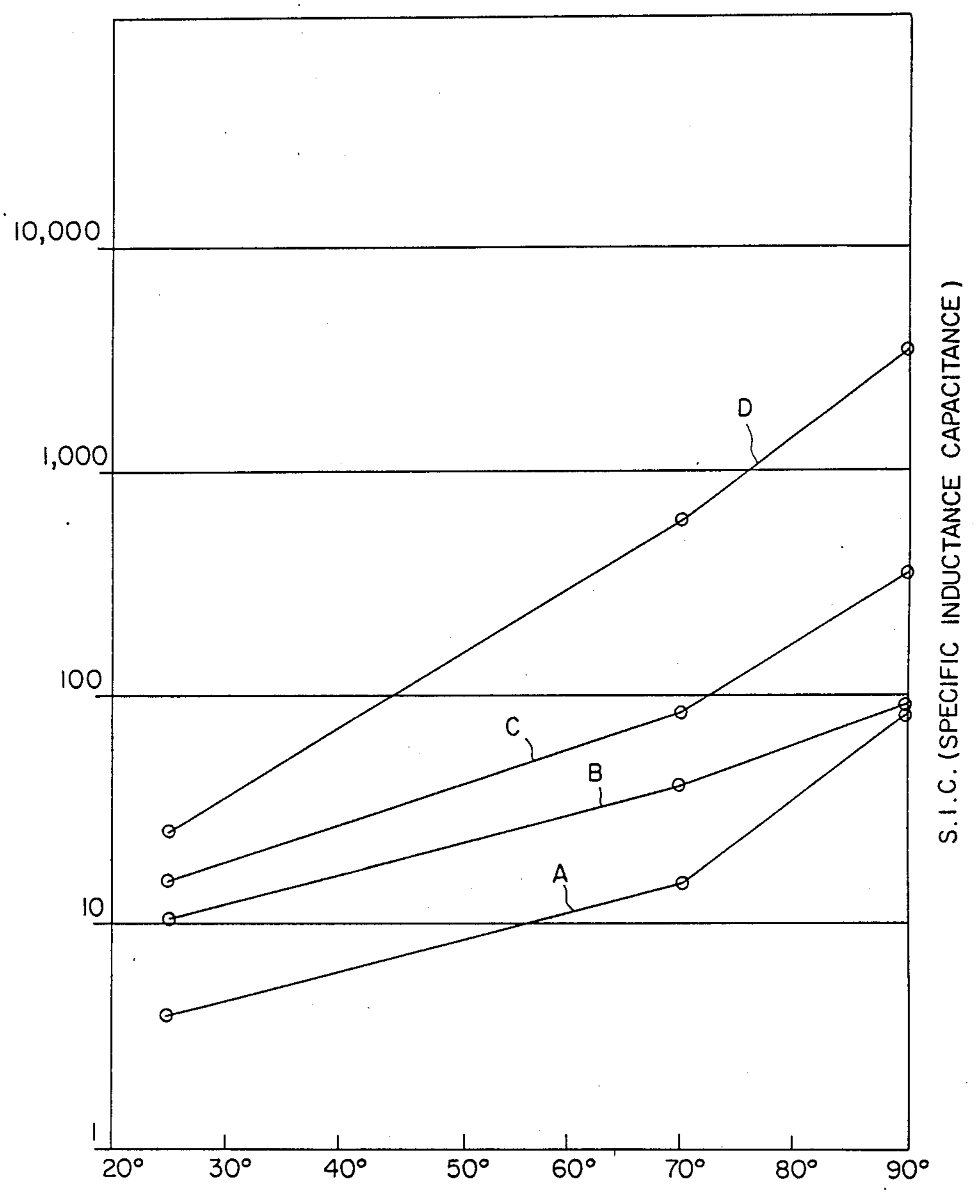
FIG. 4 is a chart on which S.I.C. is plotted against temperature for materials of this invention and the prior art.
Figure 5:
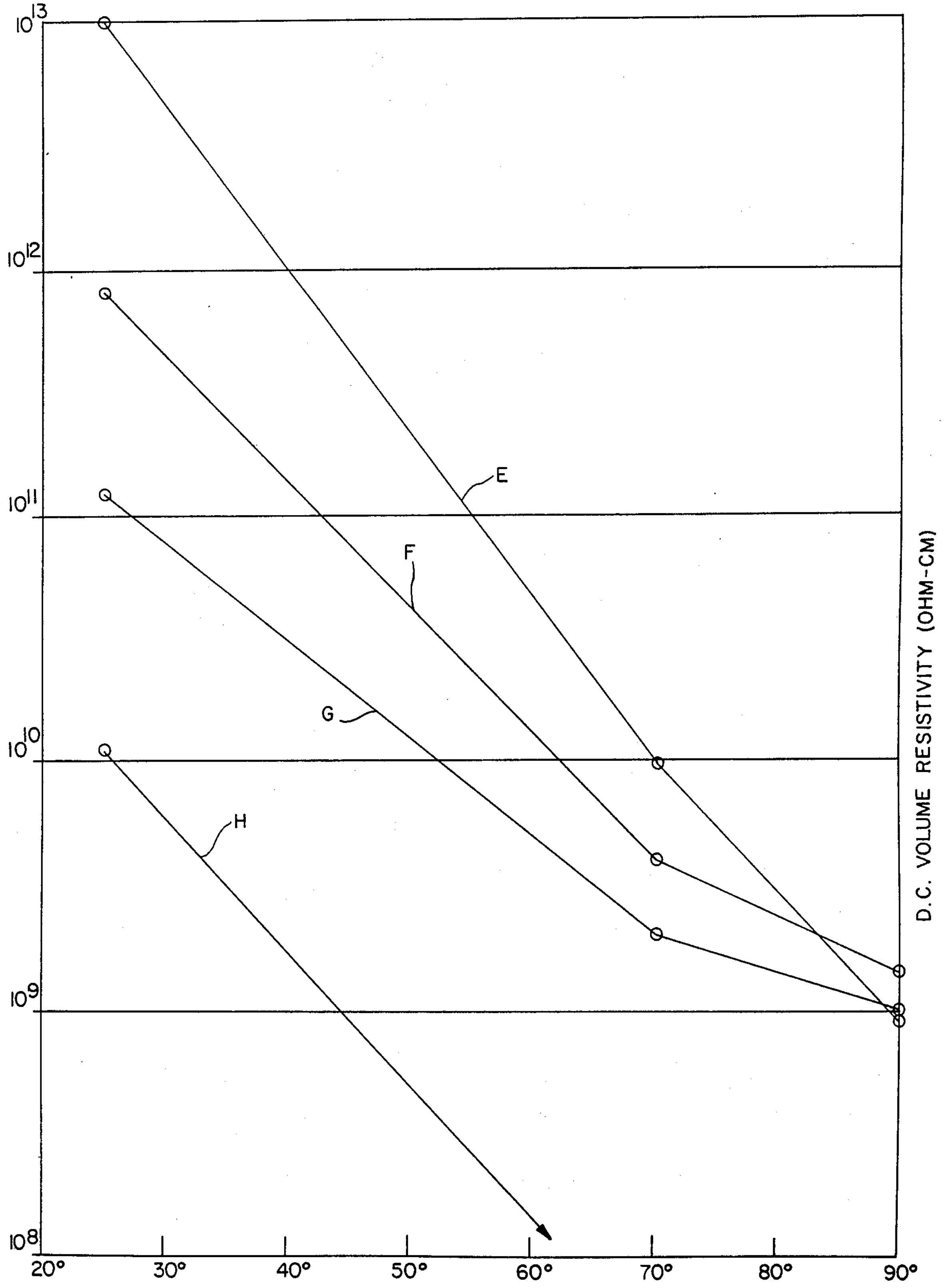
FIG. 5 is a chart on which D.C. volume resistivity (ohm-cms) is plotted against temperature (in °C.) for the materials of FIG. 4.

The four curves of FIG. 4 designated A,B, C and D representing, respectively, Nylon resin 66, Nylon resin 11, acrylonitrile butadiene (Goodyear) compound, and a carboxylated acrylonitrile butadiene (Goodyear) compound, illustrate the S.I.C. values measured in comparative experimental tests of these materials. These curves and the corresponding curves, E, F, G and H of FIG. 5 illustrating the data (D.C. volume resistivity in ohms-cms) gathered on additional measurement of the same respective materials, indicate a considerable difference between the desired electrical properties both for the S.I.C. and the D.C. volume resistivity values. In particular, the difference as well as the magnitude of the cure measured at room temperature and 90° C. best illustrates the purpose of the invention.

Figure 6:
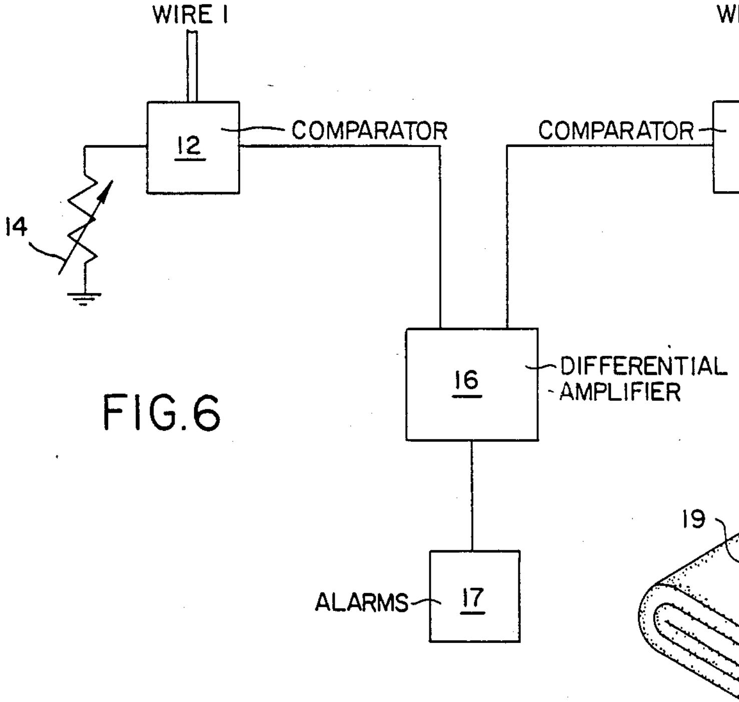
FIG. 6 is a diagram of a temperature-sensing alarm system capable of detecting a specific hotspot along an extended length of an electric conductor.

FIG. 6 is a diagram which illustrates a circuit that is new in the art and is enabled as a direct consequence of the unique properties of the insulation materials of this invention. The apparatus involved is a temperature-sensitive alarm device which is actuated to sound or otherwise signal an overheat condition whenever the difference in temperature between a control or ambient conductor and a sensing conductor exceeds a predetermined maximum. More specifically, in the illustrated device, the D.C. resistance difference between wires 7 and 8, either (of FIG. 3) which may serve as the ambient reference is monitored continuously. Wire 7 is connected to comparator gate 12, while wire 8 is connected to comparator gate 13, the two wires being connected to a battery (not shown) and being coextensive and spaced 10 mils apart over their lengths through a zone 10 to be temperature-monitored by this apparatus. Zone 10 consists of the portion of insulating sheath 9 disposed between wires 7 and 8.

At ambient or start up temperature, gates 12 and 13 are adjusted to the same voltage by balance controls 14 and 15, respectively. At 35° C., the two gates are again adjusted to a different common reference voltage to establish the sensitivity of the device. Then, with gates 12 and 13 in balance, differential gate 16 will monitor differences in potential and a 0.7 volt differential will trigger alarm device 17.

Those skilled in the art will recognize that the specific means and components used for the purposes and functions of the comparator gates, balance controls, differential gate and alarm device are the operator's choice to a substantial extent.

Figure 7:
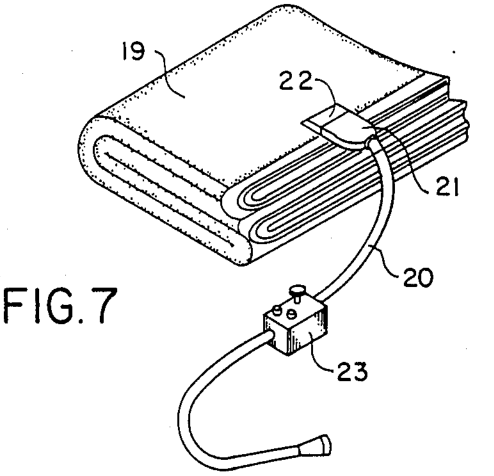
FIG. 7 is a representation of a typical electrical blanket shown folded.

The embodiment of this invention in an electric resistance heating apparatus, specifically an electric blanket 19, is illustrated in FIG. 7 which corresponds in general to FIG. 9 of referenced U.S. Pat. No. 2,581,212, the disclosure of which in respect to the details of the electric components and circuits and the physical structure of the blanket assembly are hereby incorporated herein by reference. In this FIG. 7 combination, the structure and mode of operation are generally similar to that described and claimed in the said -212 Patent, but the results, particularly the length of life in service, especially in high humidity circumstances, are quite different. That distinction is attributable to the use of the novel thermal-sensitive polymeric material of this invention in place of the Nylon polyamide resin or other material specified in the -212 Patent, the other components of the blanket and associated means disclosed therein being the same in structure and function except that the cord section 20 connecting plug 21 of plug and socket 22 to control box 23 is constructed in like manner to the blanket flexible leader. By thus including a sensitive wire from plug 21 to control box 23 and connecting that sensitive wire in the circuit, and providing as well, the counterpart of thermal-sensitive polymeric material of this invention in combination structurally and functionally as in blanket 19 itself, protection will be provided against the consequences of overheating in the cord section or control cable, just as it is in the case of the blanket.

The following illustrative, but not limiting examples of experiments performed in exploring important parameters and aspects of the invention including actual practice of this invention in preferred form will serve to further inform those skilled in the art of the novel features and the important advantages of this invention which are attributable to them.

EXAMPLE 1

To test the effect of acrylonitrile upon the S.I.C. and the D.C. volume resistivity of acrylonitrile butadiene rubber two formulations were prepared, one containing 23 percent and the other 32 percent arcrylonitrile, and then tested with the results set forth in Table II.

TABLE II

| Compound | S.I.C. Room T. | S.I.C. 30° C. | S.I.C. 90° C. | D.C. Vol. Res (ohm-cm) Room T. | D.C. Vol. Res (ohm-cm) 70° C. | D.C. Vol. Res (ohm-cm) 90° C. |
|---|---|---|---|---|---|---|
| 23% Acrylonitrile | 10.1 | 41.0 | 84.5 | $7.0 \times 10^{10}$ | $4.9 \times 10^9$ | $1.3 \times 10^9$ |
| 32% Acrylonitrile | 13.0 | 52.0 | 128.0 | $4.6 \times 10^{10}$ | $2.8 \times 10^9$ | $1.0 \times 10^9$ |

EXAMPLE 2

In an experiment similar to that of Example 1, the effect of carboxylation was tested by preparing a formulation of acrylonitrile butadiene and another of carboxylated acrylonitrile butadiene of approximately the same acrylonitrile content. The data collected on testing these two materials are stated in Table III.

TABLE III

| Compound | S.I.C. Room T. | S.I.C. 70° C. | S.I.C. 90° C. | D.C. Vol. Res. (ohm-cm) Room T. | D.C. Vol. Res. (ohm-cm) 70° C. | D.C. Vol. Res. (ohm-cm) 90° C. |
|---|---|---|---|---|---|---|
| Butadiene (68%) Acrylonitrile (26%) Carboxyl (6%) | 27.4 | 593 | 1355 | $1.17 \times 10^{10}$ | * | * |
| Butadiene (72%) Acrylonitrile (28%) | 15.6 | 84.1 | 135 | $1.20 \times 10^{11}$ | $2.0 \times 10^9$ | $1.0 \times 10^8$ |

*unable to read

EXAMPLE 3

In still another experiment, the beneficial effects of polyvinyl chloride were tested by preparing a blend of 100 parts of a commercial product marketed by Goodyear under the designation XV-1 which contains 70% carboxylated acrylonitrile butadiene, 40 parts of silica (market designation HiSil 1233), one part of stearic acid, one part of alkylated diphenylamine, and 30 parts of polyvinyl chloride. Electrical tests of this formula yielded the data set out in Table IV.

TABLE IV

| Temp. (°C.) | S.I.C. | D.C. Vol. Res. | % Power Factor |
|---|---|---|---|
| Room Temp. (25) | 12.0 | $1.91 \times 10^{11}$ | 22.7 |
| 70 | 123.6 | $9.17 \times 10^8$ | 160.8 |
| 90 | 261.6 | $3.82 \times 10^8$ | 215.6 |

This formulation, which is suitable for extrusion as thin film insulation on a wire, would be quite useful as a temperature detector in accordance with this invention.

EXAMPLE 4

The dramatic enhancement of desirable electrical properties of the basic insulating materials of this invention by addition of certain fillers is illustrated by an experiment in which Catalpo clay and silica were used in varying amounts in acrylonitrile butadiene rubber containing 32 percent acrylonitrile. The two different formulations are set forth in Table V together with the electrical properties test data.

TABLE V

| Formulations | S.I.C. Room T. | S.I.C. 70° C. | S.I.C. 90° C. | D.C. Vol. Res. (ohm-cm) Room T. | D.C. Vol. Res. (ohm-cm) 70° C. | D.C. Vol. Res. (ohm-cm) 90° C. |
|---|---|---|---|---|---|---|
| #1- 75 parts filler (40 $SiO_2$, 35 Catalpo clay) | 13.0 | 52.0 | 128.0 | $4.6 \times 10^{10}$ | $2.8 \times 10^9$ | $1.1 \times 10^9$ |
| #2- 75 parts filler (75 parts Catalpo clay) | 21.7 | 249.0 | 746.0 | $8.2 \times 10^9$ | $3.8 \times 10^8$ | * |

*unable to read

EXAMPLE 5

Nine different thermoplastic rubber or thermoset plastic formulations (a through o set forth below) were made by milling the stated ingredients together. The resulting compositions were evaluated for S.I.C. in accordance with ASTM Test No. D-150 and volume resistivity in accordance with ASTM Test No. D-257. The tests were run using 0.1 inch thick slabs of sample of 4.5 inch diameter.

Electrical properties for the compositions are presented in Table VI in which NBR means acrylonitrile-butadiene copolymer and NBR—COOH means carboxylated NBR, and the percentage of acrylonitrile (AN) or acid (COOH) as acrylic or methacrylic acid is stated.

(a) NBR: Uniroyal A:
(b) NBR: Uniroyal B:
(c) NBR: Uniroyal C:

-continued (d) NBR: Uniroyal D:

| Parts (a) | (b) | (c) | (d) | Ingredient |
|---|---|---|---|---|
| 100 | | 100 | 100 | Paracril BJLT-M-40-2 (32% AN) |
| | 100 | | | Paracril AJ (23% AN) |
| 5 | 5 | 5 | 5 | Zinc Oxide |
| 1 | 1 | 1 | 1 | Stearic Oxide |
| 1 | 1 | 1 | 1 | Naugard 445 |
| 40 | 40 | | | Silica (HiSil 215) |
| 35 | 35 | 75 | 50 | Catalpo Clay which is kaolin |
| 20 | 20 | | 10 | Plasticizer (Paraplex G54) |
| 0.5 | 0.5 | 0.5 | 0.5 | Spider Sulfur |
| 1.5 | 1.5 | 1.5 | 1.5 | Methyl Tauds |
| 2.5 | 2.5 | 2.5 | 2.5 | MBTS (Altax) |
| 1.5 | 1.5 | 1.5 | 1.5 | Tauds |
| 208 | 208 | 208 | 173 | |

(e) NBR: Goodrich 1:
(f) NBR: Goodrich 2:

-continued 251.3

(i) NBR—COOH: Chemigum NX 775:

| Parts | Ingredient |
|---|---|
| 100.0 | Chemigum NX775 (Goodyear; 26% AN, 6% COOH) |
| 20.0 | Plasticizer (dioctyl phthalate) |
| 80.0 | Hard Clay (kaolin) |
| 2.0 | Stearic Acid |
| 20.0 | Carbon Black (FEF) |
| 1.0 | Carbowax 4000 |
| 0.3 | Spider Sulfur |
| 2.0 | Accelerator (methyl tauds) |
| 1.0 | Accelerator (Amax #1) |
| 5.0 | Treated Zinc Oxide (Protox 169) |
| 251.3 | |

TABLE VI

| Polymer Type | % An | % COOH | S.I.C. R.T. | S.I.C. 70° C. | S.I.C. 90° C. | D.C. Vol. Res. (Ohm-cm) R.T. | D.C. Vol. Res. (Ohm-cm) 70° C. | D.C. Vol. Res. (Ohm-cm) 90° C. |
|---|---|---|---|---|---|---|---|---|
| Nylon 66 | | | 6.00 | 15.0 | 80.0 | $1.5 \times 10^{12}$ | $4 \times 10^{10}$ | $6 \times 10^{8}$ |
| NBR: Uniroyal A(a) | 32 | | 13.0 | 52.7 | 128 | $4.63 \times 10^{10}$ | $2.7 \times 10^{9}$ | $1.09 \times 10^{9}$ |
| NBR: Uniroyal B(b) | 23 | | 10.1 | 41.0 | 84.5 | $7.02 \times 10^{10}$ | $4.88 \times 10^{9}$ | $1.33 \times 10^{9}$ |
| NBR: Uniroyal C(c) | 32 | | 21.7 | 249 | 746 | $6.78 \times 10^{9}$ | $4.02 \times 10^{8}$ | * |
| NBR: Uniroyal D(d) | 32 | | 21.3 | 291 | 1194 | $8.16 \times 10^{9}$ | $3.77 \times 10^{8}$ | * |
| NBR: Goodrich 1(e) | 33 | | 9.0 | 9.39 | 161.3 | $5.87 \times 10^{10}$ | $2.93 \times 10^{9}$ | $5.38 \times 10^{8}$ |
| NBR: Goodrich 2(f) | 33 | | 55.1 | 47.1 | 136.3 | $7.57 \times 10^{10}$ | $3.03 \times 10^{9}$ | $7.10 \times 10^{8}$ |
| NBR: Goodrich 3(g) | 33 | | 16.13 | 136.3 | 185.8 | $7.33 \times 10^{10}$ | $1.83 \times 10^{9}$ | $5.62 \times 10^{8}$ |
| NBR: Chemigum N715B(h) | 28 | | 15.6 | 84.1 | 135 | $1 \times 10^{11}$ | $2 > 10^{9}$ | $8 \times 10^{8}$ |
| NBR: COOH: Chemigum NX775(i) | 26 | | 27.4 | 593.0 | 1355.0 | $1.17 \times 10^{10}$ | * | * |

*Off scale
Note: Nylon 66 values are not stable under humid conditions (g) NBR: Goodrich 3:

| parts (e) | (f) | (g) | ingredient |
|---|---|---|---|
| 100 | 100 | 100 | Hycar 1092C50 (40% AN) |
| 5 | 5 | 5 | zinc oxide |
| 1 | 1 | 1 | stearic acid |
| 2 | 2 | 2 | antioxidant 2246 |
| 100 | | 55 | plate talc (Mistron vapor) |
| | 110 | 55 | soft clay (Burgess SP-33) (Freeport Kaolin) |
| 1.4 | 1.4 | 1.4 | silica-filled silicon Ucarsil DSC-18 ( ) |
| 15 | 15 | 15 | dioctyl phthalate |
| 2 | 2 | 2 | blend of fatty acids TE-80 |
| 2 | 2 | 2 | low molecular weight poly-ethylene lubricant (AC 617A) |
| 1.5 | 1.5 | 1.5 | spider sulfur (B-1724, 80% sulfur) |
| 1.5 | 1.5 | 1.5 | MBTS (Altax) |
| 0.6 | 0.6 | 0.6 | TNTD (methyl tuads) |
| 232 | 242 | 242 | |

(h) NBR: Chemigum N715B (28% AN)
(i) NBR: COOH: Chemigum NX 775 (26% AN-6% COOH)

(h) NBR: Chemigum N715B:

| Parts | Ingredient |
|---|---|
| 100.0 | Chemigum N715B (28% AN) |
| 20.0 | Plasticizer (dioctyl phthalate) |
| 80.0 | Hard Clay (kaolin) |
| 2.0 | Stearic Acid |
| 20.0 | Carbon Black (FEF) |
| 1.0 | Carbowax 4000 (ethylene oxide polymer) |
| 0.3 | Spider Sulfur |
| 2.0 | Accelerator (methyl tauds, dimethyl thiuram disulfide) |
| 1.0 | Accelerator (Amax #1, sulfen-amide) |
| 5.0 | Zinc Oxide (Protox 169) |

This example shows that electrical properties, particularly the ratios of S.I.C. at 90° C. to room temperature, are markedly better for rubber compounds containing acrylonitrile, particularly in relatively high proportion. The carboxylated acrylonitrile butadiene exhibits even better properties, that is, even greater variation in S.I.C. values as a function of temperature.

Properties of the conventional Nylon 66 system include thermoplasticity, without appreciable flexibility; tendency to stress cracking; change in properties as a function of ambient moisture and difficulty in compounding. Nylon coatings on wire have fair high temperature aging properties and acceptable physical properties, but as shown in Table VI, do not have electrical properties appropriate for thermally-sensitive wire coverings.

Acrylonitrile butadiene copolymers (NBR) are thermosetting or curable, but are flexible and do not exhibit appreciable stress cracking. Properties of these materials are much less affected by moisture than those of Nylon. In addition, the materials have acceptable physical properties for wire coverings, and in many cases, exhibit significant differences between S.I.C.'s at room temperature and 70° C. or 90° C. These materials accordingly can be used as thermal-sensitive coatings for wires.

Carboxylated acrylonitrile butadiene copolymers have physical properties similar to the NBR polymers, but electrical properties are even less affected by moisture than properties of NBR. As is the case of NBR, these materials can be compounded. Overall, these materials, for example a compound based on Chemigum NX775, have the best temperature aging and electrical properties of the materials evaluated.

EXAMPLE 6

This example illustrates the effect of sulfur cures, sulfur bearing and peroxide cures on NBR polymer. Compounds were:

| Parts | Ingredient |
|---|---|
| 100 | Goodrich Hycar 1092C50 (33% AN) |
| 5 | Zinc Oxide |
| 1 | Stearic Acid |
| 1 | Antioxidant 2246 |
| 55 | Minstron Vapor |
| 55 | Burgess SP-33 Soft Clay |
| 20 | Catalpo Clay which is kaolin |
| 20 | G-54 Plasticizer (epoxidized polymeric) |
| 257.0 | |

Using 257 parts the following cures were investigated:

| | A | B | C |
|---|---|---|---|
| Base | 257.0 pts<br>Sulfur 2.0 parts<br>Altax 1.0 parts | Same<br>Delac NS-1.5 pts<br>Silane A189-0.5 pts<br>Sulfado 1.0 | Same<br>Dicup 40° C. - 3.5 pts |

Following are the electrical properties obtained on slabs:

| | S.I.C. | | | D.C. Vol. Res. (Ohm-cm) | | |
|---|---|---|---|---|---|---|
| | RT | 70° C. | 90° C. | R.T. | 70° C. | 90° C. |
| A — sulfurcure | 10.1 | 11.4 | 14.9 | $3.46 \times 10^{12}$ | $3.8 \times 10^{10}$ | $1.73 \times 10^{10}$ |
| B — sulfur bearing cure | 12.5 | 537.0 | 940.0 | $1.91 \times 10^{10}$ | $2.55 \times 10^{8}$ | * |
| C — peroxide cure | 9.8 | 39.7 | 70.3 | $4 \times 10^{11}$ | $4.67 \times 10^{9}$ | $1.25 \times 10^{9}$ |

Using the sulfur cure on carboxylated acrylonitrile in the same type formulations produced compounds too high in scorch for processing.

From the foregoing description, one skilled in the art can easily ascertain the essential characteristics of this invention and, without departing from the spirit and scope thereof, can make various changes and modifications of the invention to adapt it to various usages and conditions.

Throughout this specification and in the appended claims wherever percentage or proportion is stated, it is with reference to the weight basis.

What is claimed:

1. A composition of matter having special utility as insulation for an electric conductor because of the unique thermal sensitivity of its specific inductive capacitance characteristic comprising an admixture of polymeric material and filler material in proportion of about 1.5 to six parts of polymeric material per part of filler material, said polymeric material consisting of cured acrylonitrile butadiene rubber containing at least 0.5 percent carboxylic acid monomer units, and polyvinyl chloride blends of said cured acrylonitrile butadiene rubber.

2. The composition of claim 1 in which the filler material is kaolin.

3. The composition of claim 1 wherein the polymeric material is a blend of cured acrylonitrile butadiene rubber containing at least 0.5 percent carboxylic acid monomer units and polyvinyl chloride.

4. The composition of claim 3 wherein the filler is kaolin.

* * * * *